July 29, 1941.  R. M. LINDSAY  2,251,142
WHEEL ASSEMBLY
Filed March 5, 1938  6 Sheets-Sheet 1
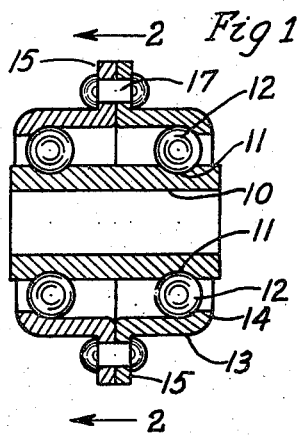
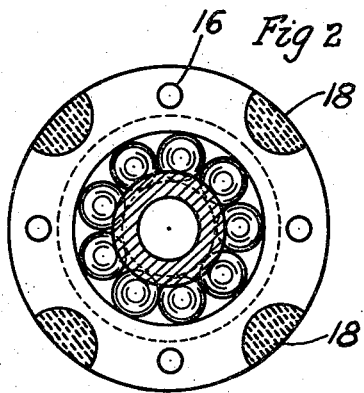
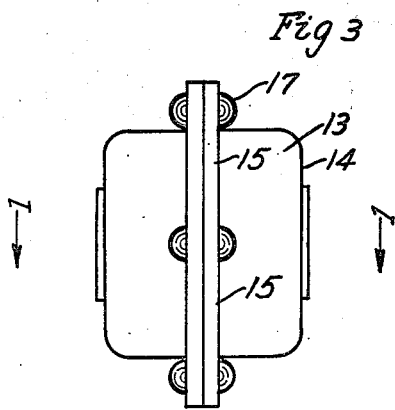
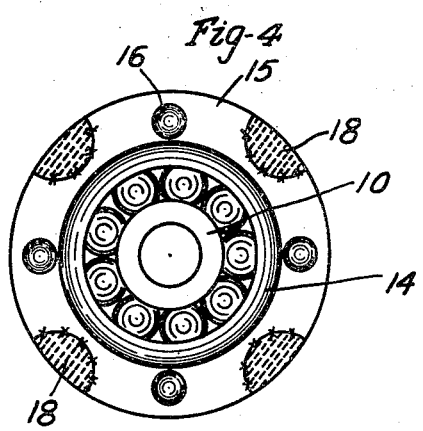
Inventor:
Robert M. Lindsay
per
Chritton, Wiles, Davies Hirschl & Dawson
Attorneys July 29, 1941.    R. M. LINDSAY    2,251,142
WHEEL ASSEMBLY
Filed March 5, 1938    6 Sheets-Sheet 2

Inventor
Robert M. Lindsay
per
Chritton, Wiles, Davies, Hirschl & Dawson
Attorneys July 29, 1941.   R. M. LINDSAY   2,251,142
WHEEL ASSEMBLY
Filed March 5, 1938   6 Sheets-Sheet 3

Inventor.
Robert M. Lindsay
per
Chritton, Wiles Davies, Hirschl & Dawson
Attorneys July 29, 1941.  R. M. LINDSAY  2,251,142
WHEEL ASSEMBLY
Filed March 5, 1938  6 Sheets-Sheet 4

Inventor
Robert M. Lindsay
per
Chritton, Wiles, Davies, Hirschl & Dawson
Attorneys July 29, 1941.   R. M. LINDSAY   2,251,142
WHEEL ASSEMBLY
Filed March 5, 1938   6 Sheets-Sheet 5

Inventor.
Robert M. Lindsay
per
Chritton, Wiles, Davies, Hirschl & Dawson
Attorneys July 29, 1941.    R. M. LINDSAY    2,251,142
WHEEL ASSEMBLY
Filed March 5, 1938    6 Sheets-Sheet 6

Inventor
Robert M. Lindsay
per
Chritton, Wiles, Davies, Hirschl & Dawson
Attorneys Patented July 29, 1941

2,251,142

UNITED STATES PATENT OFFICE 2,251,142

WHEEL ASSEMBLY

Robert M. Lindsay, Oak Park, Ill., assignor to Metal Specialties Manufacturing Co., Chicago, Ill., a corporation of Illinois Application March 5, 1938, Serial No. 194,195

4 Claims. (Cl. 301—5.7)

This invention relates to a wheel assembly and more particularly to a wheel construction which is supported directly by a novel cage assembly.

An object of the invention is to provide an anti-friction bearing cage which is assembled as a unit and which can be readily assembled with the rim parts of the wheel to form a complete wheel. A further object is to provide a ball cage construction of simple and unitary arrangement which can be formed with the rim portion of the wheel readily into a compact finished structure. Other specific objects and advantages will appear as the specification proceeds.

The invention is illustrated, in preferred embodiments, by the accompanying drawings, in which—

Figure 5:
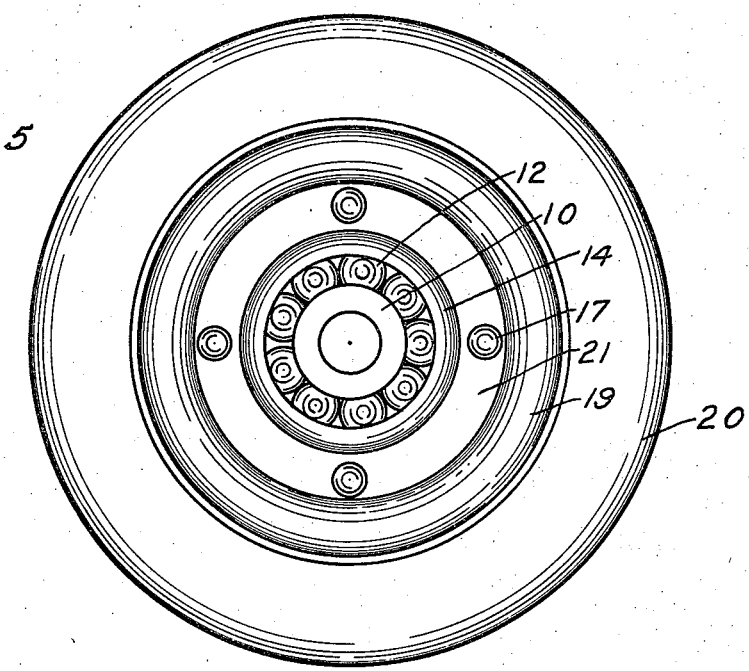
Figure 6:
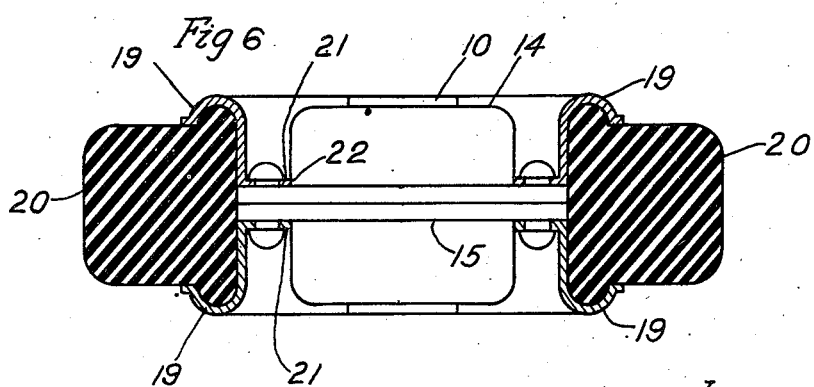
Figure 7:
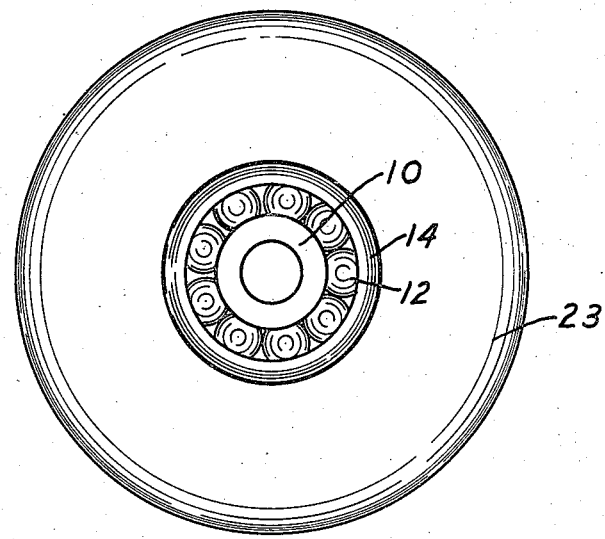
Figure 8:
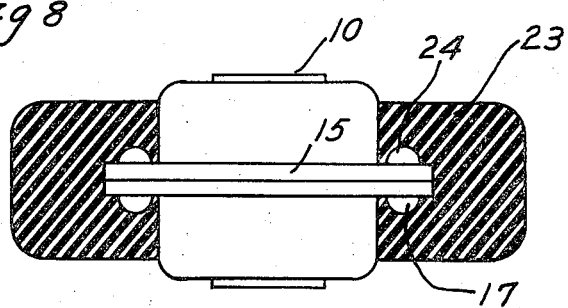
Figure 9:
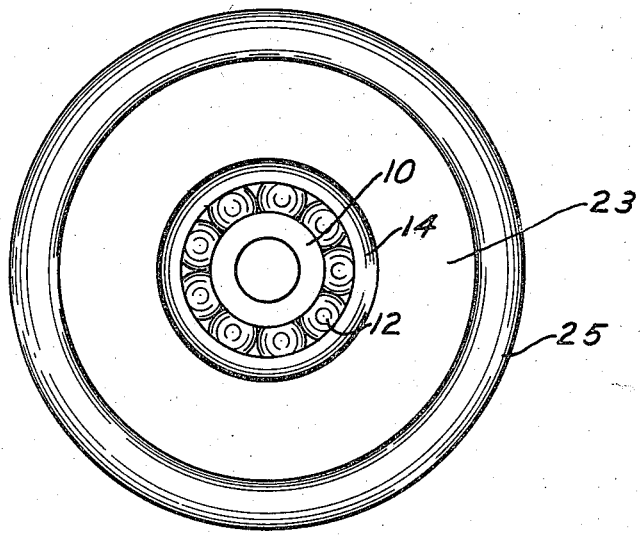
Figure 10:
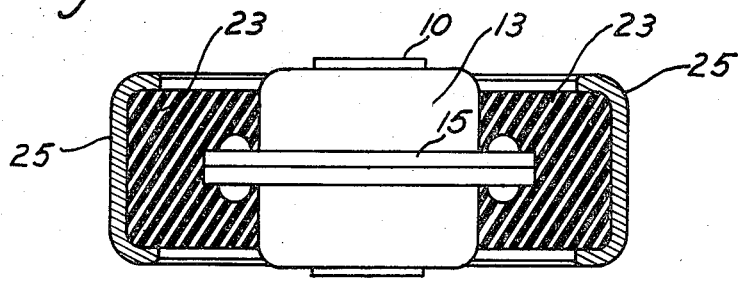
Figure 11:
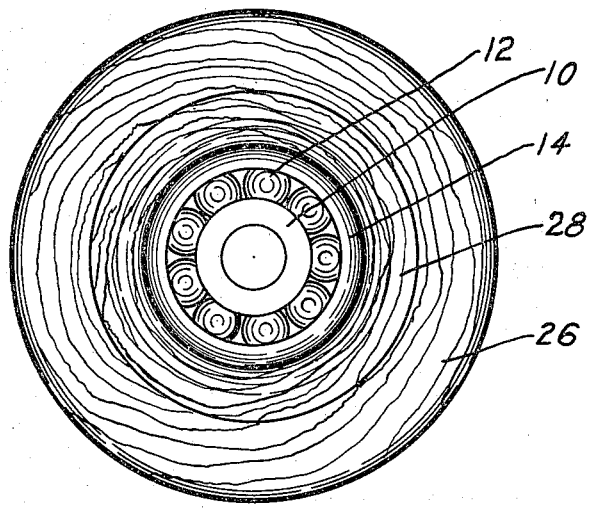
Figure 12:
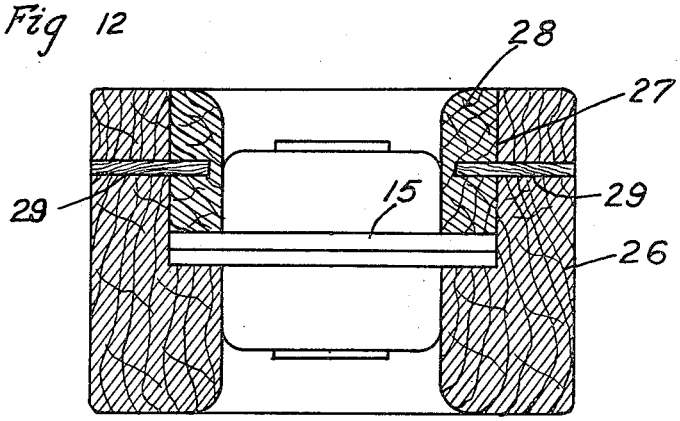
Figure 13:
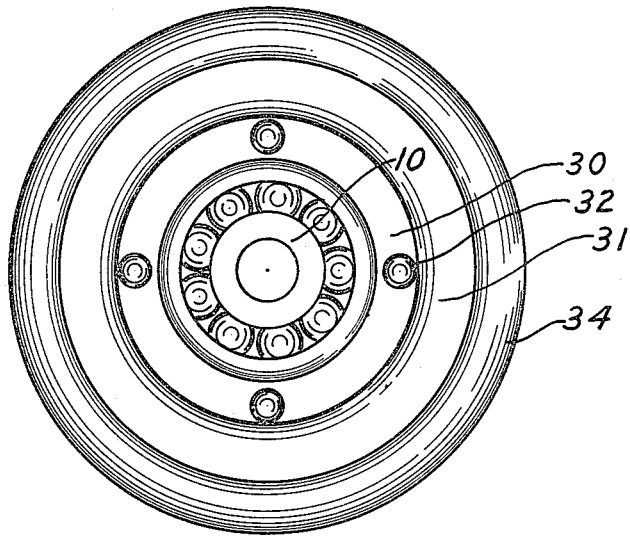

Figure 1 is a transverse sectional view of the bearing cage assembly forming a part of my invention, the section being taken as indicated at line 1 of Fig. 3; Fig. 2, a vertical sectional view, the section being taken as indicated at line 2 of Fig. 1; Fig. 3, a side view in elevation; Fig. 4, an end view in elevation; Fig. 5, an end view in elevation of the cage unit incorporated with a rim unit; Fig. 6, a transverse sectional view of the structure shown in Fig. 5, the cage unit being left unsectioned; Fig. 7, a modified form of rim assembled to the cage unit; Fig. 8, a transverse section of the structure shown in Fig. 7, the cage unit being unsectioned; Fig. 9, a side view in elevation of the cage unit assembled with another form of tire or rim; Fig. 10, a transverse sectional view of the structure shown in Fig. 9, the cage unit being left unsectioned; Fig. 11, a side view in elevation of the cage unit assembled with another form of tire or rim; Fig. 12, a transverse sectional view of the structure shown in Fig. 11, the cage unit being left unsectioned; Fig. 13, a side view in elevation of the cage unit assembled with another form of tire or rim; and Fig. 14, a transverse sectional view of the structure shown in Fig. 13, the cage unit being shown unsectioned.

In the cage unit structure shown specifically in Figs. 1 to 4 inclusive and generally in all the remaining figures, I provide a central shaft bearing or race 10 for receiving the axle (not shown). The race is provided on its outer side with a series of grooves 11 for receiving the balls 12.

For maintaining the balls within the grooves, I provide a ball cage shell structure or outer race in two parts or cups. Each cup 13 is provided with outwardly and inwardly turned end portions 14 serving to confine the balls within the cage, and on its inner side with outwardly turned flanges 15. The flanges are provided with aligned openings 16 through which rivets 17 may be passed at the time the cage is assembled or at a later stage when the rim is secured to the flange. In this instance, the rivets secure not only the flanges 15 together but also the flanges to the rim.

In assembling the parts, the cups 13 are placed in position about the balls and the flanges 15 are then spot welded as indicated by the numeral 18. As above stated, the rivets 17 may now be placed in position or they may be later placed in position as desired.

The ball cage unit, as described, is complete and may be handled as a one-piece article. In the further assembly with the wheel, it can be handled with facility without danger of misalignment. Furthermore, the bearing is tested before it is assembled with the wheel so that it will not later be necessary to disassemble an entire wheel in order to remove a defective bearing.

Heretofore it has been quite common, in the assembly of wheels, to discover after the complete assembly, that the bearing is defective whereupon it is often necessary to destroy the entire wheel; or, at least, in the disassembly thereof, a great deal of time is consumed. With the present structure, the bearing unit is made, the parts brought into proper alignment, and a test made before further steps are taken in the assembly. There is no possibility of further misalignment in the assembly and there is no need for a disassembly of the wheel later because of a defective bearing.

In the preferred structure shown in Figs. 5 and 6, the metal rim members 19 which confine the rubber tire 20 are provided with downwardly extending spaced flanges 21. The flanges 21 are provided with openings 22 which are aligned with the openings 16 of the flanges 15. The rivets are extended through both openings, namely openings 22 and 16, and serve to secure the rim members 19 to the flanges 15 while at the same time securing flanges 15 together. The assembly is extremely quick and the structure is sturdy. The tire 20 may be of rubber or other suitable material.

In the structure shown in Figs. 7 and 8, I employ with the ball cage unit, a resilient tire 23 which may be formed of rubber or other suitable material. The tire, because of its resilience, can be pressed into position and it is confined upon the hub of the ball cage by the flanges 15 and by the rivets 17. The rivets 17 engage recesses 24 in the tire 23.

In the structure shown in Figs. 9 and 10, the rubber or resilient tire 23 is provided with a metal tread or rim 25. The resilient tire 23 is secured to the ball cage unit as described in connection with Figs. 7 and 8.

In the structure shown in Figs. 11 and 12, the ball cage unit is assembled with a wood tire 26. The flanges 15 are here merely spot welded, rivets not being employed. The tire 26 is provided with a cutaway portion 27 on one side and an annular insert 28 is employed. Preferably, the insert 28 is glued to the tire 26 when placed in position so as to form a sturdy locking member for maintaining tire 26 upon the flanges 15. In addition to the glue, wooden pegs 29 may be driven through aligned holes in the tire 26 and the insert 28.

Figure 14:
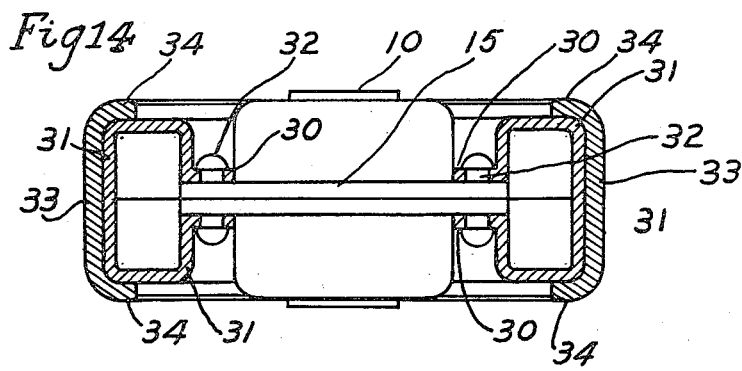

In the structure shown in Figs. 13 and 14, the flanges 15 of the ball cage unit are received within flanges 30 of the metal cups 31. Rivets 32 extend through the flanges 30 and the flanges 15 so as to confine the metal members 31 against the flanges 15 and so as to secure together the flanges 15. The separable cups 31 are locked together by an outer metal rim 33 which is provided with inwardly spun ends 34.

In the assembly operation, the ball cage unit is first formed, the balls being placed upon the bearing member or race 10 and the cups 13 being assembled thereabout with the flanges 15 brought together. The unit is spot welded to form a unitary structure. If a resilient structure, such as is shown in Figs. 7 to 10 inclusive is employed, the rivets 17 are put in place as illustrated in Figs. 1 to 4 inclusive. These rivets not only secure flanges 15 together but also interlock with grooves in the resilient tire to lock the tire upon the cage.

If a structure such as is shown in Figs. 5, 6, 13 and 14 is employed, the rivets are not placed in position until after the metal parts are formed and assembled with their flanges lying against flanges 15. Then the rivets are placed in position to secure not only the metal parts and flanges 15, but to reinforce the securing of flanges 15 together. If a structure such as is shown in Figs. 11 and 12 is employed, rivets are dispensed with.

In the assembly of the structure shown in Figs. 5 and 6, the members 19 are brought together, as illustrated in Fig. 6, with the flanges 21 aligned with flanges 15 so that the rivets may be extended through openings 22 and 16. The heads of the rivets are then formed, thus in a single operation assembling the entire tire structure upon the ball cage structure.

In the assembly of the structure shown in Figs. 7 and 8, the resilient tire 23 is simply pressed into position so as to form an interlocking engagement between the recesses 24, flanges 15, and the corresponding recesses within the tire 23. The structure shown in Figs. 9 and 10 is identical except that a metal rim 25 is employed covering the outer portion of the resilient core.

In the assembly of the structure shown in Figs. 11 and 12, the wooden tire 26 is first inserted from one side. Then the insert 28 is placed in position, the contacting surfaces between it and tire 26 being provided with glue which sets and forms a sturdy bond between the two parts, and the large pins 29 may then be driven through holes in the two parts to further lock them together. While the tire 28 is shown formed of wood, it will be understood that composition materials, laminated materials, and other like structures may be used in place of the wood.

In the assembly of the structure shown in Figs. 13 and 14, the flanges 30 of the cups 31 are brought about the flanges 15, as shown in Fig. 4, and rivets are passed through openings in the flanges and the opening 16 in flanges 15, and then the heads formed on the rivets to secure these parts together. Later a metal rim 33 is spun into the position shown and serves to lock the cups 31 together.

While in the foregoing description, I have set forth certain specific arrangements and details of construction, it will be understood that these may be modified considerably without departing from my invention. It will also be obvious that equivalent materials may be employed in place of those set out in the illustrations.

The foregoing detailed description has been given for clearness of understanding only, and no unnecessary limitations should be understood therefrom, but the appended claims should be construed as broadly as permissible, in view of the prior art.

I claim:

1. In a wheel structure of the class described, a central race member provided with grooves for receiving balls, an outer race member engaging said balls to confine them within said grooves, said outer race member consisting of two cups having inwardly turned outer flanges and outwardly turned inner flanges, said flanges being welded together and provided with spaced rivet holes, a tire, a pair of rim members receiving said tire and provided with inwardly extending flanges receiving the inner flanges of said outer race member, rivets extending through aligned holes in said last-mentioned flanges, and inner flanges of said outer race member for securing said parts together.

2. In a wheel structure of the character described, a central race member equipped with grooves for receiving balls, an outer race member engaging said balls to confine them within said grooves, said outer race member consisting of a pair of cups, each cup having an outer inwardly turned flange and an inner outwardly turned flange, said outwardly turned flanges being welded together and riveted together at spaced spots, a tire rim secured to said flanges by said rivets and extending around said outer race member, and a tire mounted on said rim.

3. In a wheel structure of the class described, a central race member provided with grooves for receiving balls, an outer race member engaging said balls to confine them within said grooves, said outer race member consisting of two cups having inwardly turned outer flanges and outwardly turned inner flanges, said inner flanges being welded together and provided with spaced rivet holes, a solid rubber tire equipped with a pair of projections extending from opposite sides thereof, a pair of rim members provided with outwardly extending flanges receiving the projections of said tire and provided with inwardly extending flanges receiving the inner flanges of said outer race member, and rivets extending through aligned holes in the inwardly extending flanges of said rims and in the inner flanges of said outer race member for securing said parts together.

4. In a wheel structure of the character described, a central race member equipped with grooves for receiving balls, an outer race member engaging said balls to confine them within said grooves, said outer race member consisting of a pair of cups, each cup having an outer inwardly turned flange and an inner outwardly turned flange, said outwardly turned flanges being riveted together at spaced spots, a tire rim secured to said flanges by said rivets and extending around said outer face member, and a tire mounted on said rim.

ROBERT M. LINDSAY.